United States Patent [19]

Mansfield

[11] Patent Number: 5,379,800

[45] Date of Patent: Jan. 10, 1995

[54] CAM OPERATED VALVE

[75] Inventor: Philip A. Mansfield, Bristol, England

[73] Assignee: Rolls-Royce plc, London, England

[21] Appl. No.: 200,018

[22] Filed: Feb. 22, 1994

[30] Foreign Application Priority Data

Mar. 27, 1993 [GB] United Kingdom ............ 9306418

[51] Int. Cl.⁶ .............................................. F16K 1/16
[52] U.S. Cl. .................................. 137/875; 251/212
[58] Field of Search .............. 137/875; 251/58, 212, 251/251

[56] References Cited

U.S. PATENT DOCUMENTS

| | | | |
|---|---|---|---|
| 2,939,274 | 6/1960 | Olsum | 251/212 X |
| 3,280,560 | 10/1964 | Marchant et al. | |
| 4,030,290 | 6/1977 | Stachourah | 251/212 X |
| 4,067,540 | 1/1978 | Slade | 251/212 X |
| 4,587,803 | 5/1986 | Nightingale et al. | |

Primary Examiner—John C. Fox
Attorney, Agent, or Firm—Oliff & Berridge

[57] ABSTRACT

A cam operated valve mechanism for directing the flow in a fluid flow duct to selective alternative outlets. The valve comprises an annular array of segmented elements which are each pivotally mounted to an axially translatable sleeve disposed coaxially within the duct. In a first axial position the sleeve extends across port and starboard alternative flow outlets, and in a second axial position extends downstream thereof. Each valve element comprises a cam follower which engages an axially extending cam track formed in the duct surface. The profile of the cam track is such that translation of the sleeve from its first to second axial position causes each of the valve elements to rotate from a stowed to a deployed position, and thereby obturate the duct.

14 Claims, 7 Drawing Sheets

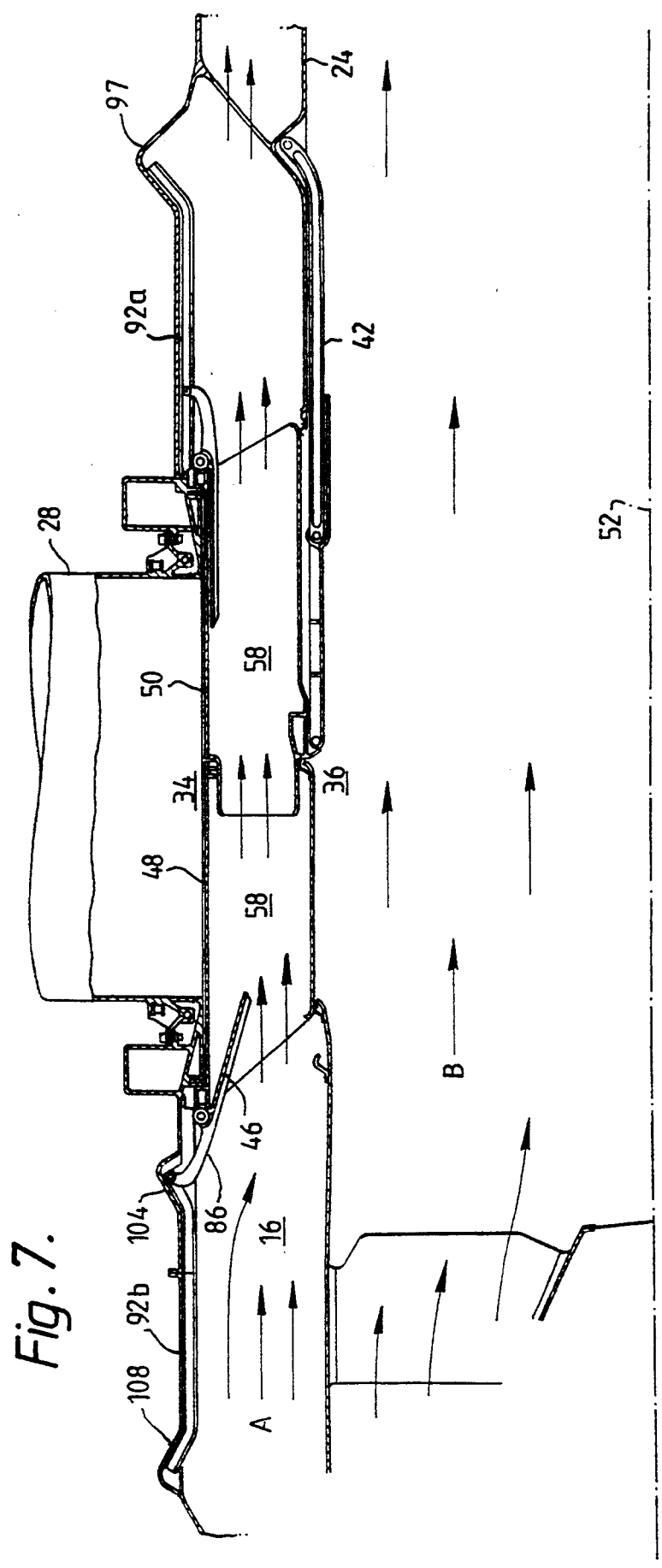

CAM OPERATED VALVE

FIELD OF THE INVENTION

The invention concerns a cam operated valve mechanism for a fluid flow duct which operates to direct fluid flow to selective alternative flow exits. In particular, the invention concerns a valve mechanism for use in a vertical take-off and landing (VTOL) aircraft powerplant application, in which engine gases are selectively diverted to alternative discharge nozzles.

BACKGROUND OF THE INVENTION

The present invention relates specifically to a gas turbine engine of the type described in U.S. Pat. No. 3,280,560. In general this patent discloses a gas turbine engine having a plurality of side mounted vectorable lift nozzles, and a conventional axial jet pipe propulsion nozzle. In use, the engine gases are either selectively directed to the side nozzles to generate lift, or to the jet pipe nozzle to provide forward thrust.

In known engine applications of this type it is usual to provide diverter valve means to achieve the required flow redirection. An example of such a valve is described in U.S. Pat. No. 4,587,803. Unfortunately, this and other know diverter valve arrangements tend to be mechanically complex, and as such add appreciably to the overall cost and weight of the engine.

An objective of the present invention is, therefore, to provide a simple low cost low weight diverter valve, and in particular a diverter valve suitable for use in a VTOL powerplant application.

SUMMARY OF THE INVENTION

According to the invention there is provided a valve arrangement operative to block a generally cylindrical fluid flow duct having a main longitudinal axis comprising:
- an axially translatable annular sleeve member coaxially disposed within the duct,
- an annular array of segmented elements, each one pivotally mounted in relation to the sleeve member about a respective pivot axis orthogonal to the duct axis,
- cam means fixed in relation to the duct and extending in the longitudinal direction of the duct, and
- whereby each of the segmented elements engage the cam means such that translation of the sleeve member along the duct axis causes the segmented elements to rotate from a stowed position to a deployed position thereby to block the duct.

The invention will now be described by way of example only, with reference to the accompanying drawings.

BRIEF DESCRIPTION OF THE DRAWINGS

FIGS. 5, 6 and 7 show the same detailed sectional view as FIG. 4 but with the valve in respective second, third and fourth configurations.

DETAILED DESCRIPTION OF THE PREFERRED EMBODIMENT OF THE INVENTION

Figure 1:
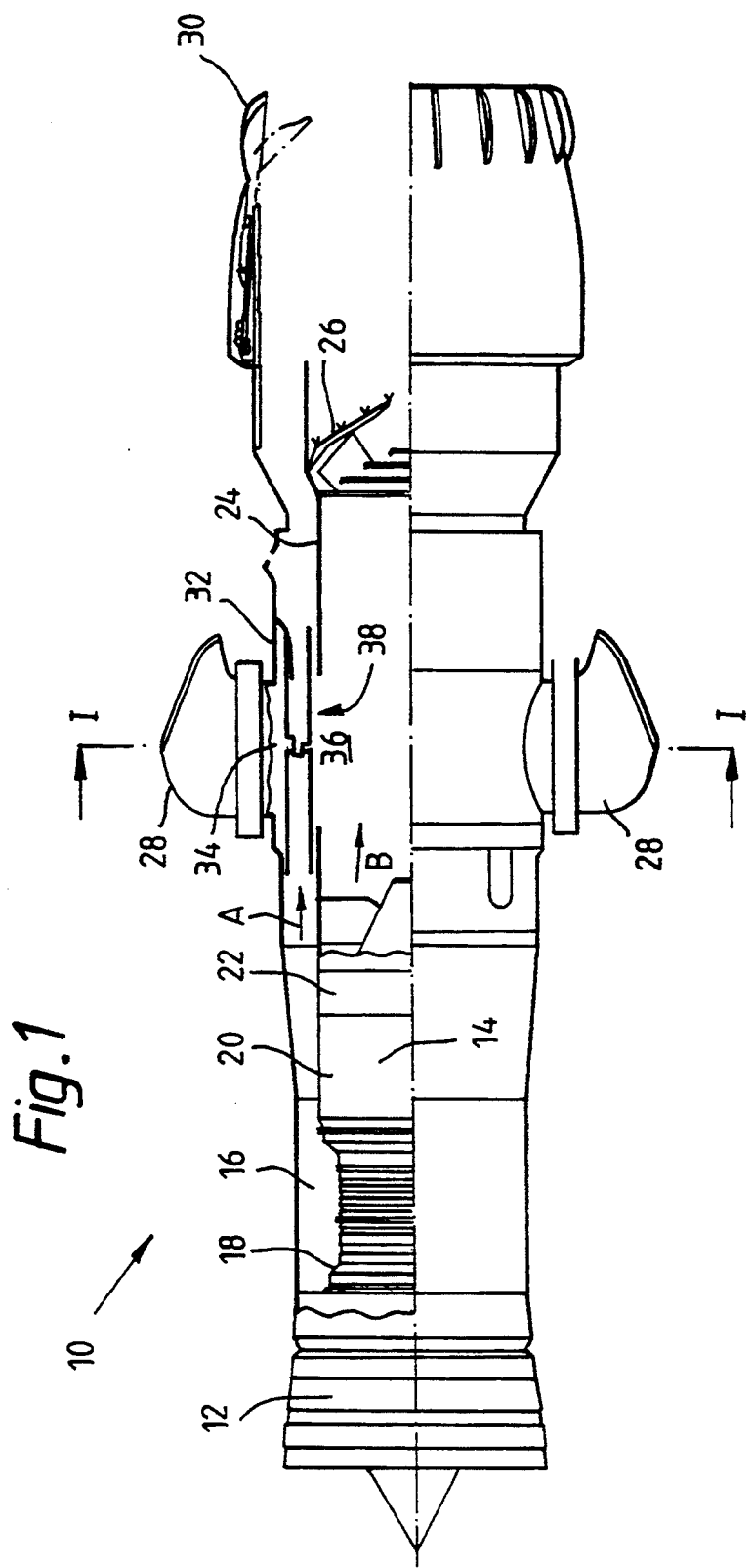
FIG. 1 is a part sectional part fragmentary view of a gas turbine engine employing a valve of the present invention.

Referring first to FIG. 1, there is shown a gas turbine engine 10 for a VTOL aircraft application. The engine is shown in part cut-away part sectional form to reveal the internal features of the engine, particularly the diverter valve mechanism.

The engine shown is of the by-pass type which comprises, a front fan assembly 12, and a core engine 14 which is surrounded by an annular by-pass duct 16. In flow series the core engine comprises, a compressor section 18 which receives a portion of the fan discharge flow, a combustion section 20, a turbine section 22 which drives both the fan assembly 12 and the compressor 18, and a jet pipe 24 complete with afterburning means 26.

In the embodiment shown, the engine has selectively alternative discharge nozzles in the form of a pair of side mounted rotatable nozzles 28 and a conventional axial nozzle 30. The by-pass duct casing 32 is formed with port and starboard alternative flow outlets 34 which communicate with respective port and starboard side nozzles 28. The side ports 34 are formed in the by-pass duct casing 32 downstream of the turbine exhaust section 22 and confront corresponding port and starboard alternative flow outlets 36 formed in jet pipe 24. Adjacent the side outlets 34 and 36 there is provided a diverter valve means 38 for selectively directing core and by-pass flows, depicted by arrows A and B respectively, either exclusively to the rotatable nozzles 28, or exclusively to the axial nozzle 30.

Figure 4:
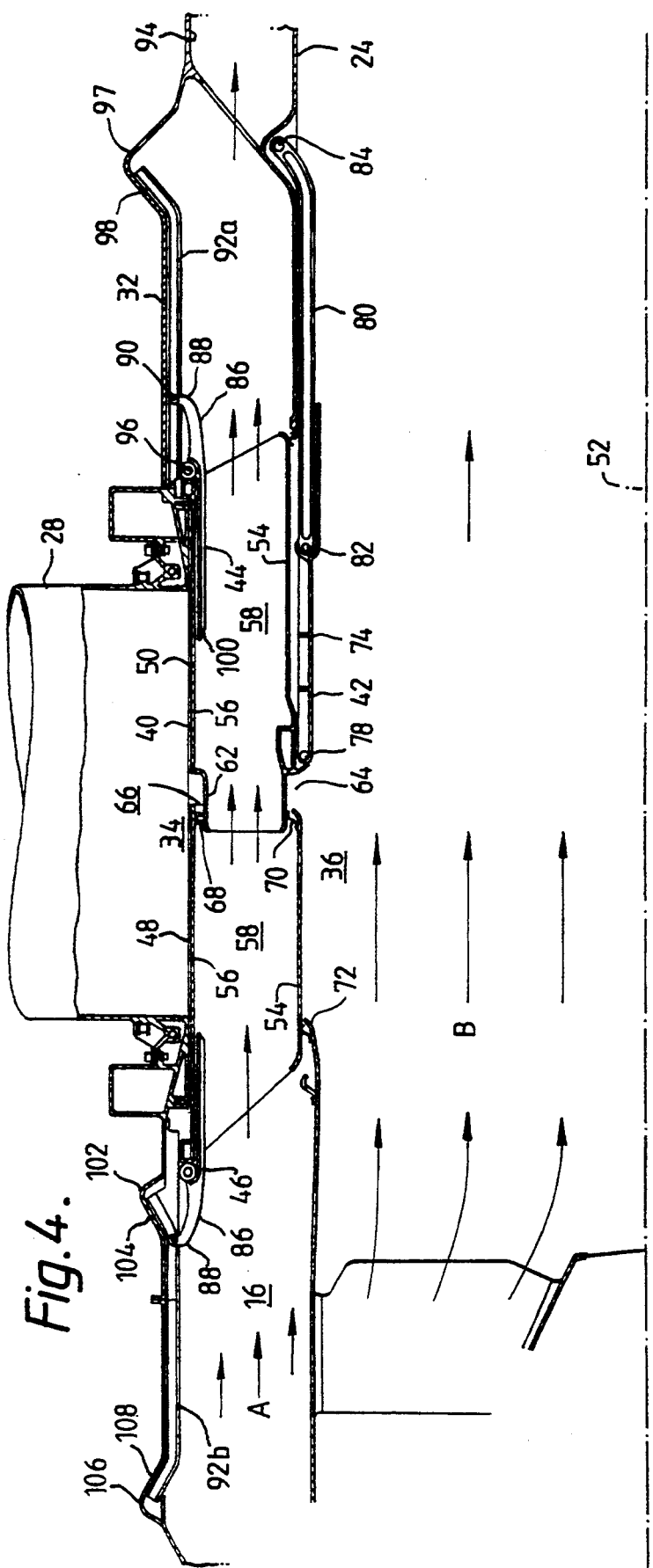
FIG. 4 shows a detailed sectional half view along line III—III of FIG. 2 with the valve in a first configuration.

Referring now to FIG. 4 which shows in detail the diverter valve 38 in half sectional view. In the embodiment shown diverter valve 38 comprises a two part sleeve valve 40, a segmented jet pipe blocker valve 42 and a first bypass blocker valve 44.

Sleeve valve 40 comprises a pair of axially moveable sleeve members 48,50 disposed within the bypass duct 16 about engine axis 52. Each sleeve member 48,50 comprises coaxial inner and outer cylindrical wall elements 54,56 which lie adjacent jet pipe 24 and duct casing 32 respectively. Wall elements 54,56 are spaced apart so as to define an annular passageway 58 therebetween. The wall elements are separated by means of a plurality of circumferentially spaced radial supports 60 best seen in FIG. 2.

In the axial thrust configuration shown, sleeve members 48,50 extend in abutting relationship over the side outlet ports 34,36 so as to prevent engine gases discharging to nozzles 28. As shown, the downstream sleeve member 50 has an upstream end portion 62 which has a reduced annular section. In this configuration end portion 62 extends into the downstream end of sleeve 48 to define inner and outer annular gaps 64,66. A sealing ring 68 is provided to seal the outer annular gap 66 between the overlapping sleeves 48,50, and an annular spring element 70 is similarly provided to seal the inner gap 64. In addition, an annular spring element 72 is provided at the periphery of each side outlet 36 to prevent leakage of Jet pipe flow into bypass duct 16.

The jet pipe blocker 42 of diverter valve 38 is of a generally well know type and is best described with reference to both FIGS. 2 and 4. As shown the valve comprises an annular array of segmented elements 74 which are each pivotally mounted at their wider end 76 to the upstream end of sleeve 50 at pivot 78. Each element 74 is pivotally connected to a link element 80 at an intermediate position 82. Link elements 80 are themselves each pivotally connected to the jet pipe at 84 about an axis radially offset from pivot 82. The segmented elements 74 and link elements 80 are arranged such that in the stowed configuration of FIG. 4 elements 74 lie flat against sleeve 48 and jet pipe 24, whilst in the deployed configuration of FIG. 2 they extend radially inwards towards engine axis 52.

Bypass valve 44 of diverter valve 38 also comprises an annular array of segmented elements 86. As shown in both FIGS. 2 and 4, each of the elements 86 is pivotally mounted to the downstream end of sleeve 50 at pivot 96. The wider end 88 of each element is provided with a roller element 90 which defines a cam follower means. The roller element 90, which is spaced apart from pivot 96, engages a cam track 92a formed in the inner surface 94 of the bypass duct casing 32. The cam track 92a extends axially along the duct casing 32 between side outlet 36 and apex 97 of inclined surface 98 formed therein. The narrower end 100 of each element 86 is free and is spaced apart from pivot 96 by an amount equal to or greater than the radial depth of annular passageway 58.

Figure 2:
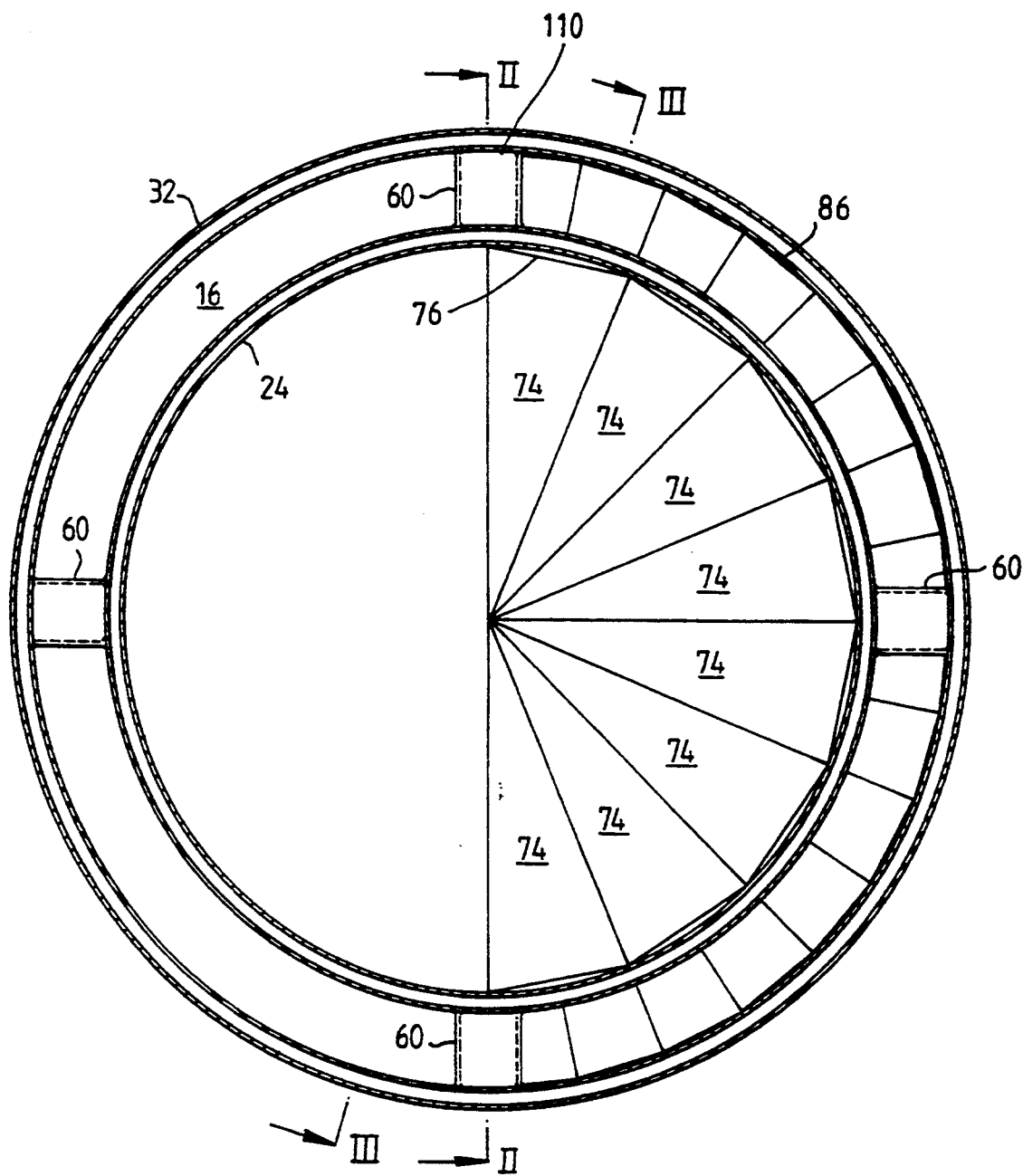
FIG. 2 shows a sectional half view along line I—I of FIG. 1, with the valve deployed for VTOL operation.

In a similar manner to segmented elements 74 of jet pipe blocker 42, elements 86 lie flat against sleeve 50 when in the stowed configuration of FIG. 4, and extend radially inwards, towards jet pipe casing 24, when in the deployed configuration of FIG. 2.

Preferably, diverter valve 38 further comprises a second by-pass valve 46 which is operative to control the by-pass flow upstream of side outlets 34,36. In this the preferred embodiment, the construction of by-pass valve 46 is identical to that of by-pass valve 44, and as such identical reference numerals have been used throughout.

In this embodiment, the profile of cam track 92b of valve 46 is different to that of cam track 92a of valve 44. In contrast to cam track 92a, cam track 92a extends between apex 102 of inclined surface 104 and apex 106 of inclined surface 108 so as to define a U-shaped cam profile.

Figure 3:
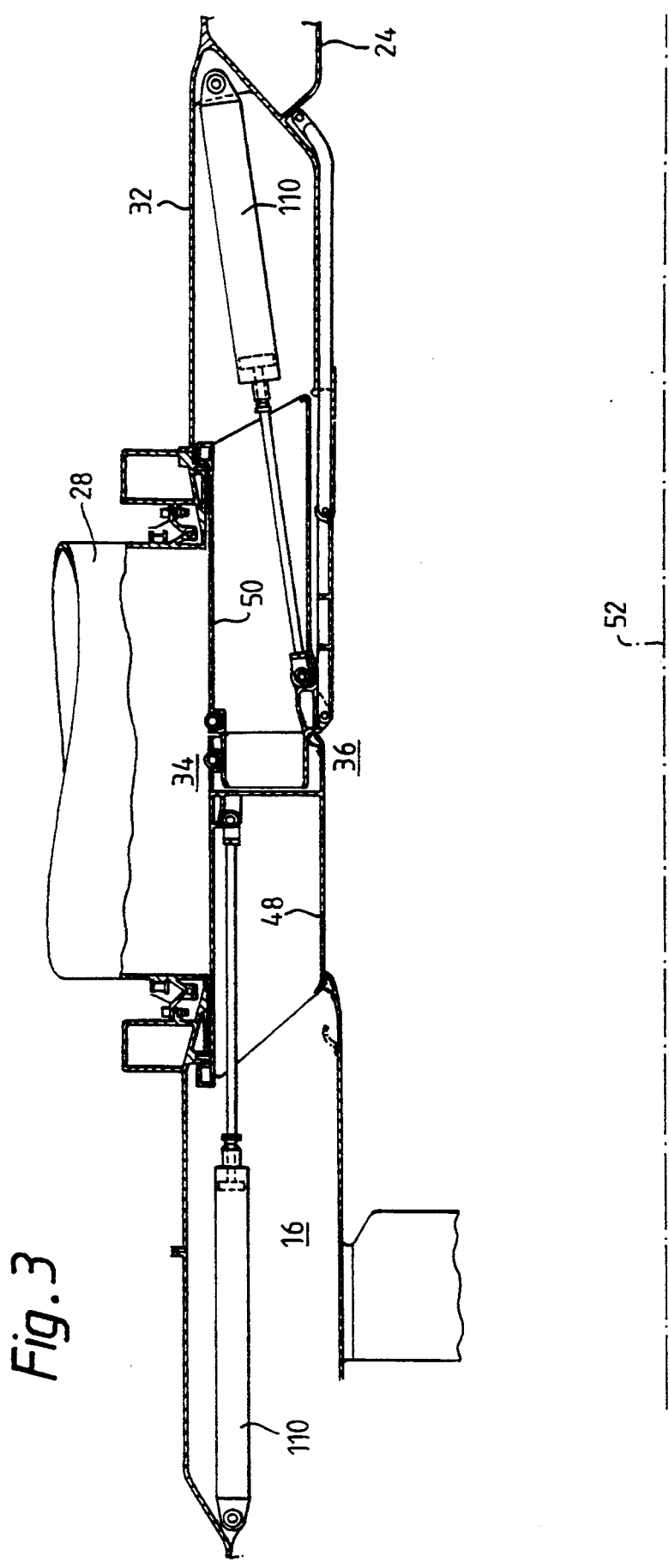
FIG. 3 shows a detailed sectional half view along line II—II of FIG. 2.

Referring now to FIG. 3 a plurality of actuator means 110 are provided for effecting independent axial translation of each of the sleeve members 48,50. Actuators 110 are each anchored at one end to bypass duct casing 32 and at the other to the respective sleeve member 48,50. Preferably four actuators are provided per sleeve for effecting even loading when energized. The actuators may be each located within an aerodynamic housing defined by radial supports 60, and thereby minimize pressure losses in bypass duct 16.

In the configuration of FIG. 4 the diverter valve 38 acts to maintain separate jet pipe and bypass flows A and B which respectively comprise fan discharge air and turbine exhaust gases. In this configuration the coaxial flows are both discharged to atmosphere by nozzle 30 to generate forward thrust. In this mode additional thrust may be generated by supplying additional fuel to afterburning means 26 for combustion within jet pipe 24.

Figure 5:
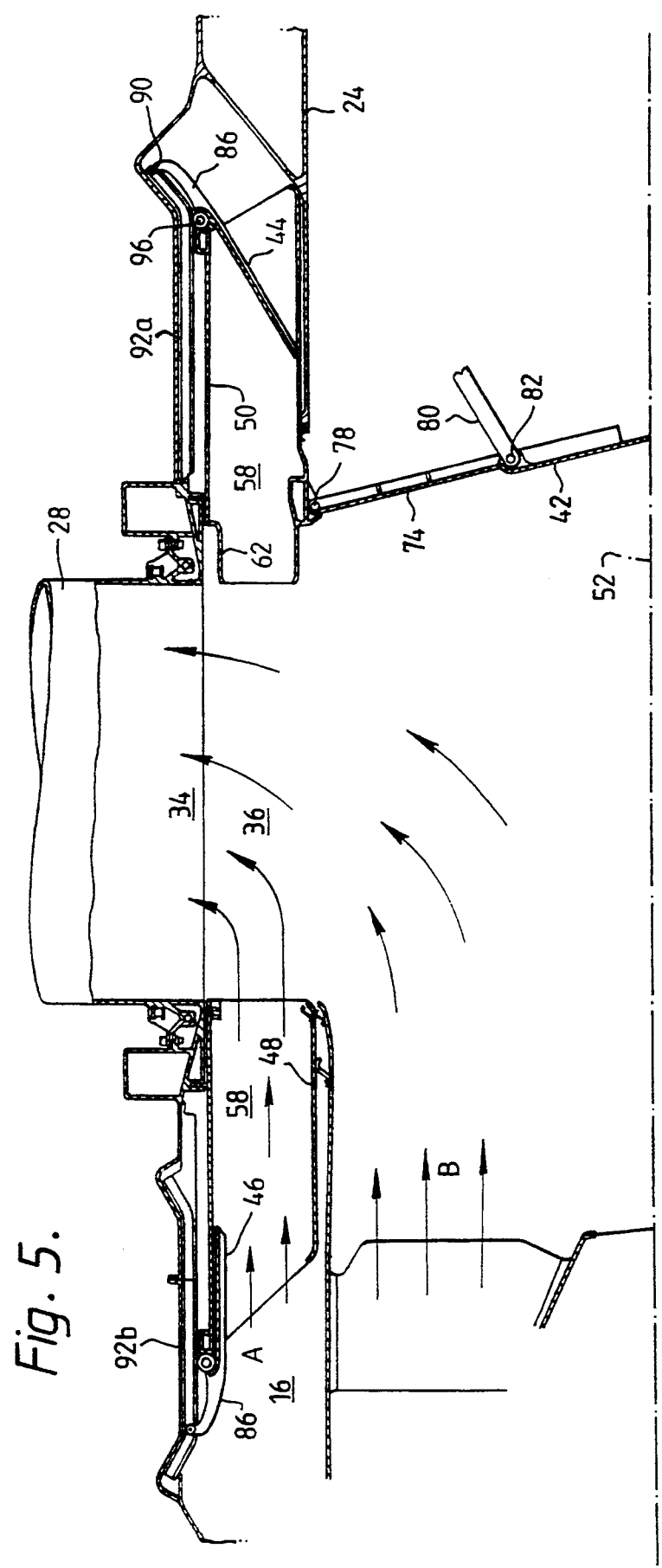

FIG. 5 shows the diverter valve 38 in the VTOL operating configuration. In this configuration sleeve members 48,50 are translated in axially opposing senses from the positions occupied in FIG. 4 by energisation of actuators 110. The translation of sleeves 48,50 causes the jet pipe blocker valve elements 74 to rotate about pivot 78 to their respective deployed positions, and thereby obturate jet pipe flow duct 24. Simultaneously elements 86 of valve 44 are caused to rotate about pivot 96 by translation of the respective cam followers 90 over cam track 92a, and thereby obturate the bypass flow duct 16 downstream of side outlets 34,36. Translation of sleeves 48,50 also uncovers the side outlets 34,36 to provide a continuous flow passage from both the fan discharge and turbine exhaust regions to the side mounted discharge nozzles 28.

Figure 6:
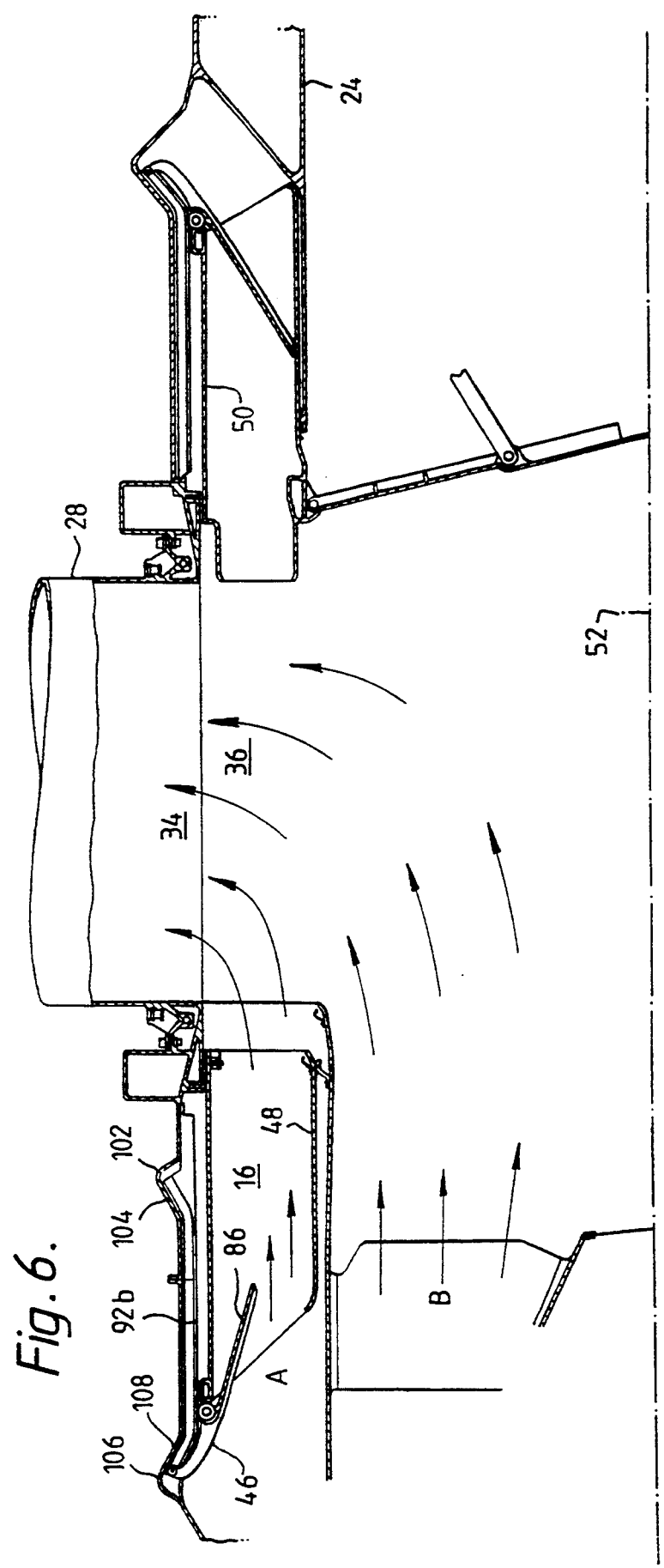

Referring to FIG. 6 which shows the diverter valve in the VTOL configuration of FIG. 5 but with sleeve 48 translated in an upstream direction. This additional axial movement causes elements 86 of valve 46 to deploy to the position shown, and thereby restrict the flow area of the bypass duct upstream of side outlets 34,36. Obviously in other applications it may be desirable to obturate the bypass duct 16 upstream of side outlets 34,36, for example if the bypass flow is to be directed elsewhere. In the present embodiment this could be achieve by altering the angle of inclined cam surface 108 such that elements 86 deploy fully as in valve 44.

FIG. 7 show the diverter valve in the axial thrust configuration of FIG. 4 but with sleeve 48 translated in a downstream direction. Again this additional axial movement causes elements 86 of valve 46 to deploy. Obviously, the axial movement required to translate elements 86 over inclined cam surface 108 determines the extent of axial overlap between sleeves 48,50 at their confronting ends.

Although the invention has been described with reference to a gas turbine engine, it is to be appreciated that the invention is not restricted to such application, but is applicable to any type of fluid flow duct. Likewise, it is to be appreciated that the invention is not restricted to use in fluid flow ducts having coaxial inner and outer flow passageways.

We claim:

1. A valve arrangement operative to block a generally cylindrical fluid flow duct having a main longitudinal axis comprising:
   an axially translatable annular sleeve member coaxially disposed within the duct,
   an annular array of segmented elements, each one pivotally mounted in relation to the sleeve member about a respective pivot axis orthogonal to the duct axis,
   cam means fixed in relation to the duct and extending in the longitudinal direction of the duct, and
   whereby each of the segmented elements engage the cam means such that translation of the sleeve member along the duct axis causes the segmented elements to rotate from a stowed position to a deployed position thereby to block the duct.

2. A valve arrangement as claimed in claim 1 wherein the segmented elements pivotally connect to a first end of the sleeve member.

3. A valve arrangement as claimed in claim 1 wherein the segmented elements are each provided with cam follower means.

4. A valve arrangement as claimed in claim 3 wherein for each segmented element the cam follower means is spaced apart from the respective pivot axis.

5. A valve arrangement as claimed in claim 1 wherein the cam means comprises a trackway inclined relative to the duct axis along part of its length.

6. A valve arrangement as claimed in claim 1 wherein the trackway is integral with the duct.

7. A fluid flow duct arrangement comprising:

a generally cylindrical duct having a main longitudinal axis, an upstream end defining a flow entry, a downstream end defining a first flow exit, and at least one side aperture defining a second alternative flow exit disposed therebetween, and valve means located within the duct operative to open one of the alternative exits whilst simultaneously closing the other, including axially translatable sleeve valve means moveable between a first valve position obstructing the second flow exit, and a second valve position exposing the second flow exit, at least one annular array of segmented elements, each pivotally mounted in relation to the sleeve valve means about a respective pivot axis orthogonal to the duct axis, and at least one cam means fixed in relation to the duct and extending in the longitudinal direction of the duct, whereby each of the segmented elements engage the cam means such that translation of the sleeve valve means from the first to the second valve position causes the segmented elements to rotate from a stowed to a deployed position, thereby to block the duct.

8. A fluid flow duct arrangement as claimed in claim 7 wherein the duct comprises a pair of generally cylindrical concentric wall members which together define inner and outer coaxial flow passageways each having first and second alternative flow exits.

9. A fluid flow duct arrangement as claimed in claim 8 wherein the valve means is located in the outer flow passageway and is operative to open and close the alternative flow exits of the outer flow passageway.

10. A fluid flow duct arrangement as claimed in claim 9 wherein the sleeve valve means comprises an inner and an outer cylindrical sleeve spaced apart within the outer flow passageway such that the outer sleeve lies adjacent the outer duct wall and the inner sleeve lies adjacent the inner duct wall.

11. A fluid flow duct arrangement as claimed in claim 10 wherein the sleeve valve means comprises an upstream sleeve valve member and a downstream sleeve valve member.

12. A fluid flow arrangement as claimed in claim 11 wherein in the first valve position the upstream and downstream sleeve valve members are positioned in abutment to obstruct the second alternative flow exits in both the inner and outer wall members, and in the second valve position in spaced apart relation to expose the second flow exits.

13. A fluid flow duct arrangement as claimed in claim 12 wherein a first annular array of segmented elements pivotally connect to the upstream sleeve valve member and a second annular array of the segmented elements to the downstream sleeve valve member.

14. A fluid flow duct arrangement as claimed in claim 8 wherein the outer flow passageway forms the bypass flow duct and the inner flow passageway the core gas flow duct of a gas turbine engine.

* * * * *